United States Patent
Dufour

(10) Patent No.: US 10,848,502 B2
(45) Date of Patent: Nov. 24, 2020

(54) DETECTION AND PREVENTION OF HOSTILE NETWORK TRAFFIC FLOW APPROPRIATION AND VALIDATION OF FIRMWARE UPDATES

(71) Applicant: Webroot Inc., Broomfield, CO (US)

(72) Inventor: David Dufour, Superior, CO (US)

(73) Assignee: WEBROOT INC., Broomfield, CO (US)

( * ) Notice: Subject to any disclaimer, the term of this patent is extended or adjusted under 35 U.S.C. 154(b) by 0 days.

(21) Appl. No.: 15/366,754

(22) Filed: Dec. 1, 2016

(65) Prior Publication Data
US 2017/0155665 A1    Jun. 1, 2017

Related U.S. Application Data

(60) Provisional application No. 62/261,468, filed on Dec. 1, 2015.

(51) Int. Cl.
*H04L 29/06* (2006.01)
*G06F 21/56* (2013.01)

(52) U.S. Cl.
CPC ........ *H04L 63/1408* (2013.01); *G06F 21/566* (2013.01); *G06F 21/568* (2013.01); *H04L 63/0281* (2013.01)

(58) Field of Classification Search
CPC ............. H04L 63/0281; H04L 63/1408; G06F 21/566; G06F 21/568; G06F 21/572; G06F 21/53
See application file for complete search history.

(56) References Cited

U.S. PATENT DOCUMENTS

| | | | |
|---|---|---|---|
| 9,270,691 B2* | 2/2016 | Klein | G06F 21/565 |
| 9,749,295 B2* | 8/2017 | McDougal | H04L 63/0281 |
| 2009/0288167 A1* | 11/2009 | Freericks | G06F 21/54 |
| | | | 726/23 |
| 2012/0124567 A1* | 5/2012 | Landry | G06F 11/1433 |
| | | | 717/168 |
| 2012/0124641 A1* | 5/2012 | Hegge | G06F 21/554 |
| | | | 726/1 |
| 2012/0167222 A1* | 6/2012 | Kim | G06F 21/563 |
| | | | 726/24 |
| 2017/0318041 A1* | 11/2017 | Zou | H04L 63/1416 |
| 2018/0152481 A1* | 5/2018 | Kraemer | G06F 21/566 |

OTHER PUBLICATIONS

Moshchuk et al. SpyProxy: Execution-based Detection of MaliciousWeb Content 2007, 16th USENIX Security Symposium.*

* cited by examiner

*Primary Examiner* — Darren B Schwartz
*Assistant Examiner* — Ka Shan Choy
(74) *Attorney, Agent, or Firm* — Sprinkle IP Law Group

(57) ABSTRACT

Aspects of the present disclosure relate to systems and methods for partitioning an OS or hypervisor utilized on a computing device from the process of proxy control. For example, a proxy may be installed on a separation kernel or firmware on a computing device that routes all data traffic received via a network connection to a cloud which performs various services such as IP reputation management, URL reputation detection and validation, malicious file filtering through potential malware detection.

18 Claims, 8 Drawing Sheets

DETECTION AND PREVENTION OF HOSTILE NETWORK TRAFFIC FLOW APPROPRIATION AND VALIDATION OF FIRMWARE UPDATES

RELATED APPLICATIONS

This application claims the benefit of U.S. Provisional Patent Application Ser. No. 62/261,468, filed Dec. 1, 2015, entitled "Detection and Prevention of Hostile Network Traffic Flow Appropriation and Validation of Firmware Updates," which application is incorporated herein by reference in its entirety.

BACKGROUND

Personal computers, business computers, mobile computing devices (e.g., smart phones and tablets), as well as the plethora of devices that makeup what is referred to broadly as the Internet of Things (TOT) (e.g., smart refrigerators, GPS units, smart thermostats, wearable computers, etc.) are continually attacked by viruses, trojans, spyware, adware, etc., collectively referred to as "malware" or "pestware." These types of programs generally act to gather information about a person or organization--often without the person or organization's knowledge. In general, attempts to hijack and hack computers of this sort involves direct communication with a device's operating system (OS), whereby code can be inserted into the device to divert the its intended use. Such hijacking often times goes unnoticed and is made easier by the malicious party simply having to obtain access to the various operating systems and/or a device's underlying hardware which is in direct communication with the OS.

Malicious attacks of this sort generally involve one or more of the following: (1) URL reputation attacks whereby a user of a device visits a website that may have malicious code embedded in it which can access and compromise an unsuspecting party's device; (2) Internet Protocol (IP) reputation attacks which utilize inbound suspect information that passes through a TCP/IP port on a device and may introduce botnets and other malicious code into the device; and (3) inbound file attacks that compromise a system when a malicious file is inadvertently downloaded and installed on a device. Common to all three of these scenarios is the ability of the attacking mechanism to directly access the OS of a device, despite the fact that antivirus software may be installed on such a device.

SUMMARY

In general terms, this disclosure is directed to the detection and prevention of hostile network traffic flow appropriation, as well as validation of firmware updates that might otherwise lead to malicious third-party attacks utilizing malware. Various aspects are described in this disclosure, which include, but are not limited to, the following aspects and examples.

Certain aspects disclosed herein relate to systems and methods for partitioning an OS or hypervisor utilized on a computing device from the process of proxy control. For example, a proxy may be installed on a separation kernel or firmware on a computing device that routes all data traffic received through TCP/IP to a cloud (e.g., server or server farm) which performs IP reputation management (which, in addition to providing other functionality, filters and/or disables communication to and from potentially malicious IP addresses), URL reputation detection and validation (e.g., by performing an up-to-date security check of the websites users are visiting, enabling network and security vendors to add a layer of real-time security to their customers' web defenses by accurately assessing the risk posed when opening a URL), and/or malicious file filtering through potential malware detection and data validation utilizing file hashes as fingerprints to uniquely identify files, regardless of filename, platform, encryption or password protection by comparing the hashed files against a network of known malicious or potentially malicious files and their respective hashes which have been designated as, for example: good, bad, or unknown/unclassified. According to an additional example, the comparison of a hashed file with a network database may identify additional security attributes associated with the file including: the type of malware it contains, the number of times the file has been seen across the network database, when the file was first detected, and the date of its classification or most recent determination.

According to various aspects disclosed herein, a security framework is provided for partitioning an OS or hypervisor of a computing device utilizing a separation kernel or firmware installed on a computing device, which further routes data traffic received by a computing device (e.g., through TCP/IP communications) to a cloud (e.g., a distributed network) that performs IP reputation management, detection and validation, URL reputation management, detection and validation and/or malicious file filtering. Accordingly, aspects of the disclosure provide certain advantages compared with previously known methods and systems for malware prevention, including: faster screening of incoming and outgoing data, file assembly of data packets, as well as an expeditious means for file hashing and file filtering. Such methods and systems that utilize proxies within separation kernels and/or firmware separate from a computing device's OS also provide access to features that may be added or updated periodically to IP reputation software, URL reputation software, and file filtering software included within the cloud framework. Furthermore, use of the separation kernel provides for the interception of potentially malicious files before they access the device's operating system, thereby providing enhanced protection for the operating system.

According to some aspects of the disclosure, the cloud may contain a cache, including a smart cache, which may utilize a dynamically updated cache of stored information that is modified to include information from a variety of sources to identify newly recognized threats that may arise in the form of malware or pestware. The cache in the cloud may account for potential changes in the source data during the caching. In aspects, a variable Time to Live (TTL) may be calculated and associated with data as it is stored in a cache. For example, cached data that is likely to change may have a shorter TTL than cached data that is less likely to change. As such, the variable TTL may be employed to increase the effectiveness, or the overall performance, of a cache by increasing access times while minimizing the likelihood that cached data becomes stale.

In further aspects, a feedback method may be employed in the cloud to update reputation and/or category information for a particular data source. In some aspects, cache effectiveness data may be collected from one or more devices that employ a smart cache. The cache effectiveness data may be analyzed against known or historical information about a particular type of data and/or a particular data source to determine whether the reputation and/or category information associated with the type of data and/or data source should be updated to provide more efficient utilization of the cache. Based upon the analysis, reputation and/or category information may be updated or otherwise modified.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting examples and non-exhaustive examples are described with reference to the following figures.

DETAILED DESCRIPTION

Figure 1:
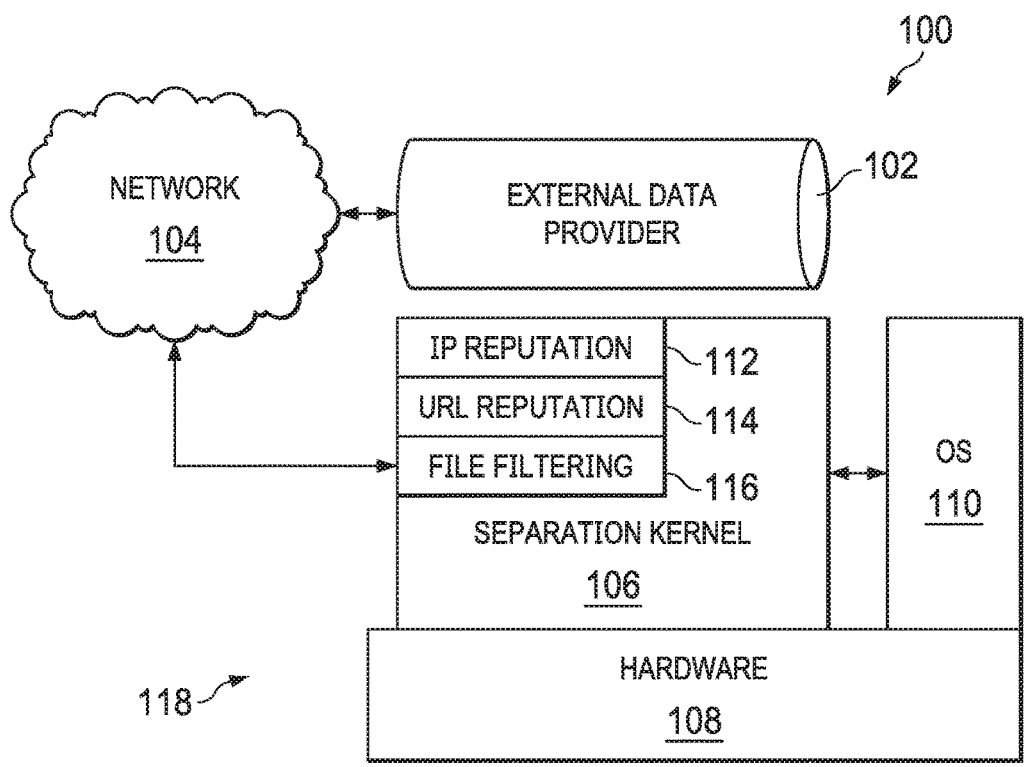
FIG. 1 illustrates a simplified structure of a distributed computer system 100 for partitioning an OS from IP reputation, URL reputation and file filtering utilizing a separation kernel.

Various embodiments will be described in detail with reference to the drawings, wherein like reference numerals represent like parts and assemblies throughout the several views. Additionally, any examples set forth in this specification are not intended to be limiting and merely set forth some of the many possible embodiments in which aspects disclosed herein may be practiced.

It will be understood by one of skill in the art that IP reputation management deals with inbound data traffic from an external data provider. Specifically, every packet on the Internet has a source and a destination IP address. Disabling communication to and from malicious IPs is effective, but poses certain difficulties without comprehensive and predictive threat intelligence. According to aspects disclosed herein, IP reputation services may provide up-to-the-minute IP intelligence.

Today, cybercriminals have an immense number of exploits and attack vectors available to them, and they use numerous techniques to hide their identities and activities, such as encrypted communications, DNS cache poisoning, URL redirection, hyperlink obfuscation, etc. However, every packet on the Internet has a source IP address and a destination IP address, so disabling inbound and outbound communications to and from IPs known to be malicious is highly effective.

Many publicly available IP lists and networks are static and outdated. This means that they cannot keep up with the dynamic nature IP addresses and are unable to block new, unknown threats. Use of such networks for analysis of potential attacks may result in high instances of false positives and/or false negatives. According to aspects of the current disclosure IP reputation services are provided for augmenting security by providing access to a dynamic IP reputation service thereby providing systems and devices with a continuously updated feed of known malicious IP addresses and corresponding data, which provides the systems and devices with the ability to easily identify threats and protect their networks. This service enhances a system or a device's ability to counter IP threats, but also avoids the taxing security processing many other IP reputation services impose. Examples disclosed herein may be utilized to power an IP intelligence service in network perimeter appliances to block suspected malicious traffic.

Aspects of this disclosure relate to receiving, by a computing device, a request for web content from a web browser application; receiving, by a separation kernel within the computing device, web traffic data related to the request for web content data such that the web traffic data is intercepted before it has access to an operating system; analyzing, by the separation kernel, the received web traffic data; performing, by the separation kernel an IP data analysis; identifying, by the separation kernel, malware from the analyzed web traffic data; modifying, by the separation kernel, any content identified as malware; providing to an OS within the computing device, analyzed web traffic data determined to be non-malicious; processing, by the computing device, web traffic data determined to be non-malicious; and displaying, by the computing device, the processed web traffic data.

According to another aspect of the disclosure, a request for web content from a web browser application is received; the request for web content from the web browser application is received by a separation kernel; a URL data analysis for determining whether a requested URL contains malware that may be transferred back to the computing device is performed by a separation kernel; an OS within the computing device is provided with data related to a requested URL that has been determined not to contain malware; data received related to a requested URL that has been determined not to contain malware to an OS within the computing device; received data related to a requested URL that has been determined not to contain malware is processed by the computing device; and the processed data related to the requested URL that has been determined not to contain malware is displayed by the computing device.

In an additional aspect, a request for web content from a web browser application is received by a computing device; data file packets related to the request for web content data is received by a separation kernel within the computing device; the received data file packets are compiled into one or more files; the one or more compiled files are hashed by the computing device; the one or more compiled files are analyzed by the separation kernel; malware associated with the one or more compiled files is identified by the separation kernel; any content associated with the compiled files determined to be non-malicious is provided to an OS within the computing device; compiled files determined to be non-malicious are processed by the computing device; and firmware contained within the computing device is updated with the compiled files determined to be non-malicious.

According to some aspects, a request for web content from a web browser application is received by a computing device; the request for web content from the web browser application is analyzed by a separation kernel within the computing device; the request for web content from the web browser application is transferred by a proxy contained within the separation kernel to a cloud-based server for determining whether malicious content may be associated with the request for web content; malware associated with the request for web content is identified by the cloud-based server; any content identified by the cloud-based server as containing malware is modified (e.g., filtered, or otherwise modified to remove malicious content); a modified set of content determined to be non-malicious from the cloud-based server is provided to an OS within the computing device; the modified set of content determined to be non-malicious is processed by the computing device; and the modified set of content determined to be non-malicious is displayed by the computing device.

Certain examples described below may relate to various types of computing devices in the ever expanding IOT universe. However, computing devices utilizing aspects described herein may include any device capable of accessing a computer network (e.g., the Internet or an intranet).

Certain aspects disclosed herein relate to systems and methods for partitioning an OS or hypervisor, utilized on a computing device, from the process of IP reputation screening and management utilizing a separation kernel on a computing device to perform IP reputation screening and management. According to such aspects a separation kernel may perform IP reputation screening and management such that malware and/or other malicious code may be captured and screened off at the separation kernel and prevented from being passed on to the OS of a computing device, preventing the OS from being compromised by IP reputation attacks.

Additional aspects relate to systems and methods for partitioning an OS or hypervisor utilized on a computing device from the process of IP reputation screening and management utilizing firmware on the computing device to perform IP reputation screening and management. According to such aspects firmware may perform IP reputation screening and management such that malware and/or other malicious code may be captured and screened off at the separation kernel and prevented from being passed on to the OS of a computing device, preventing the OS from being compromised by IP reputation attacks.

Certain aspects disclosed herein relate to systems and methods for partitioning an OS or hypervisor utilized on a computing device from the process of IP reputation screening and management utilizing a separation kernel on the computing device to perform the IP reputation screening and management. According to such aspects a separation kernel may perform IP reputation screening and management such that malware and/or other malicious code may be captured and screened off at the separation kernel and prevented from being passed on to the OS of a computing device, preventing the OS from being compromised by IP reputation attacks.

Additional aspects relate to systems and methods for partitioning an OS or hypervisor utilized on a computing device from the process of IP reputation screening and management utilizing firmware on the computing device to perform IP reputation screening and management. According to such aspects firmware may perform IP reputation screening and management such that malware and/or other malicious code may be captured and screened off at the firmware level and prevented from being passed on to the OS of a computing device, preventing the OS from being compromised by IP reputation attacks.

According to further aspects disclosed herein systems and methods are provided for partitioning an OS or hypervisor utilized on a computing device from the process of URL reputation screening and management utilizing a separation kernel on the computing device to perform the URL reputation screening and management. According to such aspects a separation kernel may perform URL reputation screening and management such that malware and/or other malicious code may be captured and screened off at the separation kernel and prevented from being passed on to the OS of a computing device, preventing the OS from being compromised by URL reputation attacks.

Additional aspects relate to systems and methods for partitioning an OS or hypervisor utilized on a computing device from the process of URL reputation screening and management utilizing firmware on the computing device to perform URL reputation screening and management. According to such aspects firmware may perform URL reputation screening and management such that malware and/or other malicious code may be captured and screened off at the firmware level and prevented from being passed on to the OS of a computing device, preventing the OS from being compromised by URL reputation attacks.

Certain aspects disclosed herein relate to systems and methods for partitioning an OS or hypervisor utilized on a computing device from the process of URL reputation screening and management utilizing a separation kernel on the computing device to perform the URL reputation screening and management. According to such aspects a separation kernel may perform URL reputation screening and management such that malware and/or other malicious code may be captured and screened off at the separation kernel and prevented from being passed on to the OS of a computing device, preventing the OS from being compromised by URL reputation attacks.

Additional aspects relate to systems and methods for partitioning an OS or hypervisor utilized on a computing device from the process of URL reputation screening and management utilizing firmware on the computing device to perform URL reputation screening and management. According to such aspects firmware may perform URL reputation screening and management such that malware and/or other malicious code may be captured and screened off at the firmware level and prevented from being passed on to the OS of a computing device, preventing the OS from being compromised by URL reputation attacks.

In other aspects systems and methods are provided for partitioning an OS or hypervisor utilized on a computing device from the process of validating firmware updates utilizing a separation kernel on the computing device to perform validation of firmware updates. According to such aspects a separation kernel may perform file filtering screening and management such that malware and/or other malicious code may be captured and screened off by the separation kernel and prevented from being passed on to the OS of a computing device, preventing the OS from being compromised by malicious file attacks.

In other aspects systems and methods are provided for partitioning an OS or hypervisor utilized on a computing device in the IOT universe from the process of validating firmware updates utilizing firmware on the computing device to perform validation of firmware updates. According to such aspects firmware may perform file filtering screening and management such that malware and/or other malicious code may be captured and screened off at the firmware level and prevented from being passed on to the OS of a computing device, preventing the OS from being compromised by malicious file attacks.

As previously discussed, many publicly available IP lists are static and outdated. This means that they cannot keep up with the dynamic nature of IP addresses and are unable to block new, unknown threats, and they may also have high instance of false positives.

According to aspects, a client device may send a request for data to a server via a network. The request may include a URL, a uniform resource identifier (URI), an IP address, or any other type of address or identifier that is capable of identifying a resource, a data source, or a device on a network.

Figure 9:
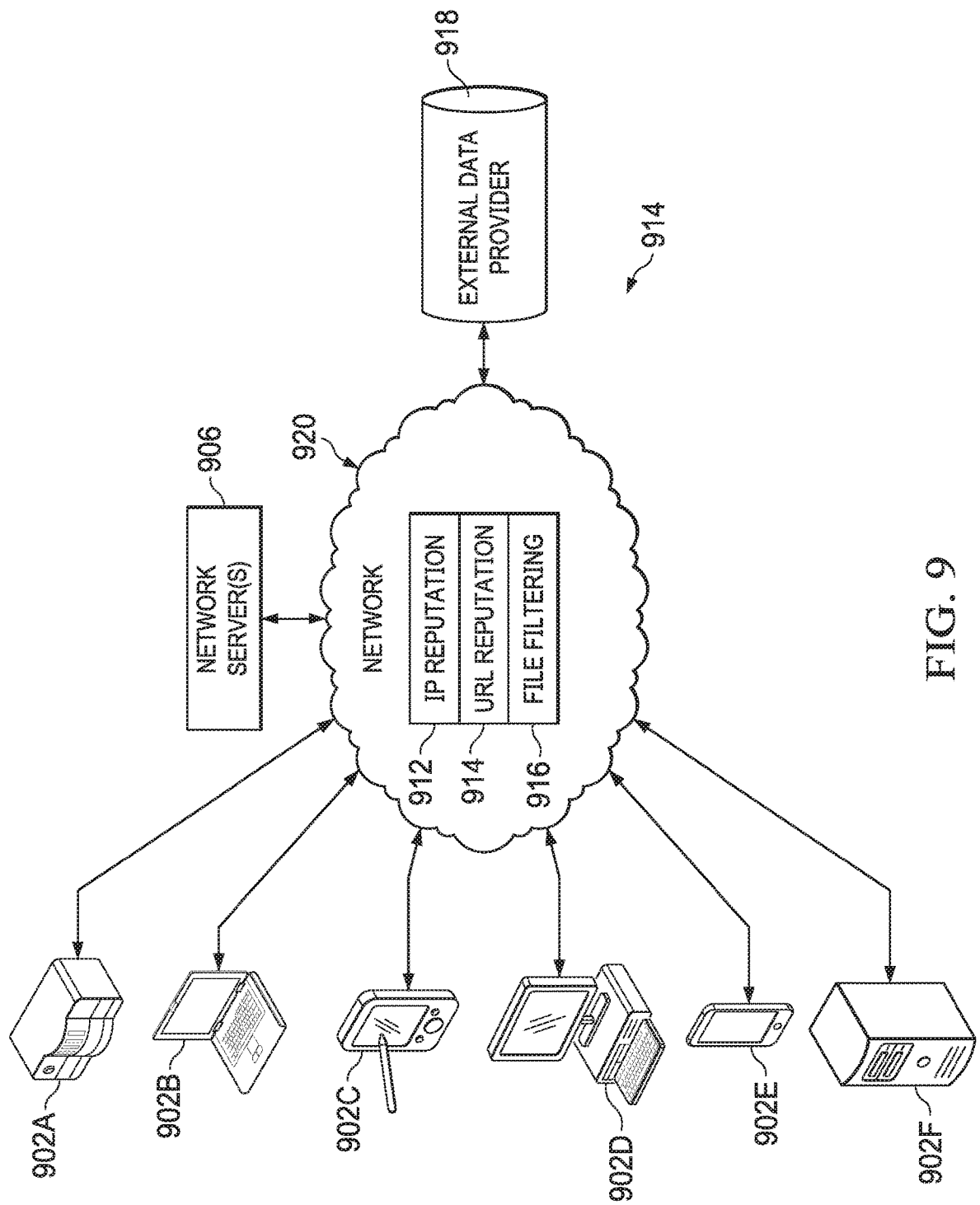
FIG. 9 is a simplified diagram of a distributed computing system in which aspects of the present invention may be practiced.

In response to receiving such a request, a network server may provide the requested data to the requesting client device via the network. While the embodiments illustrated herein are described with respect to a client device, one of skill in the art will appreciate that the aspects disclosed herein may be practiced similarly using other types of client devices, such as client devices 902A-F as depicted in FIG. 9.

According to additional aspects, reputation information may relate to the trustworthiness of a particular data source, historical performance, whether the data source is known to be a source of malware, spyware, etc. In additional examples, reputation information may represent the security risk associated with visiting a given website or URL. The higher the reputation score, the more trustworthy the website and URL and the lower the risk of visiting. Conversely, the lower the reputation score, the more likely that a visiting user will become infected with malware, experience identity theft, an unwanted trojan install, and/or be subjected to a phishing attempt. As it is impossible to know with certainty whether or not a given URL will compromise a given user at a certain time, the reputation score may comprise an expression of the probability that the visitor will be compromised.

The reputation score of a particular data source, or, in certain aspects of the disclosure, a type of data, may be obtained by analyzing characteristics, performance, behavior, etc. of the data source over a period of time. Reputation information may be included and/or be represented as a reputation score. A reputation score may be a classification (e.g., low, medium, or high reputation), a numerical expression (e.g., a value from 1-10, 1-100, 1-1000, etc.) or any other type of classifier. In examples, category information may be related to the type of content or type of data provided by a data source (e.g., news, sports, adult, real estate, etc.). In additional examples, category information for a particular data source may be identified by categorizing the type of data or content provided by the data source. According to aspects, content provided data source may be analyzed to determine one or more classifications of the content over a period of time. The classified content may be used to determine a category for a particular data source.

Referring now to the drawings, where like or similar elements are in some instances designated with identical reference numerals throughout the several views, and referring in particular to FIG. 1, a simplified structure of a distributed network 100 for partitioning an OS from IP reputation validation, URL reputation validation and file filtering, utilizing a separation kernel or firmware embedded in the hardware of a computing device in which several aspects of the invention may be implemented are provided.

As shown, a computing device 118 comprising an OS 110, hardware 108 and a separation kernel 106 is provided. The separation kernel 106 may contain software for implementing methods for performing IP reputation validation, as well as URL reputation and file filtering validation. It will be well understood by one of skill in the art that one or more of these features may be performed by the separation kernel 106 assuming the separation kernel contains the appropriate instructions for performing those features.

System 100 may comprise a distributed computer network whereby data traffic may flow between external data provider 102 (e.g., a server or server farm that handles requests for a web site such as www.webroot.com or the like) and computing device 118 by way of network 104. A separation kernel 106, may be utilized to partition an OS 110 or hypervisor (not shown) from the process of IP reputation validation and management, URL reputation validation and management, and/or file filtering. In examples, the separation kernel does not share the same memory space with the OS. As such, partitioning functionality related to IP reputation validation and management, URL reputation validation and management, and/or as file filtering using a separation kernel allows for the interception of malicious code or files before the files access the operating system, thereby eliminating the ability of the malicious code or files to infect the operating system. Additionally, the amount of code required to implement the separation kernel is small compared to an OS, thereby reducing the attack surface for the separation kernel itself thus providing better overall protection to a host device.

According to an example, data may flow from external data provider 102 through network 104 to separation kernel 106, and IP reputation management may be performed by separation kernel 106 such that the data from external data provider 102 is not passed along to the operating system until validation is performed at the separation kernel level. By initially keeping the IP reputation management process contained within a separation kernel it is possible to prevent malware from directly interacting with the OS 110, and only upon determining that the IP reputation is safe will it then be passed on to the OS 110.

According to additional aspects, data may flow into a TCP/IP stack resident in the separation kernel. IP reputation management may be performed within separation kernel 106, providing a separate protective environment, wherein malware such as botnets and other malicious content may be recognized and contained within separation kernel 106 until the malicious content is filtered or otherwise modified such that it is safe to pass along to OS 110. In contrast to the exemplary systems and methods disclosed herein, previous methods and systems for controlling pestware, malware, or other undesirable or unwanted applications and/or instructions such as botnets and other malicious data in the IP reputation environment were passed directly to the OS 110 for IP reputation management and filtering without the added benefit of partitioning the IP reputation screening from direct interaction with the OS 110, potentially compromising the OS 110 and other aspects of hardware 108 within computing device 108.

Figure 2:
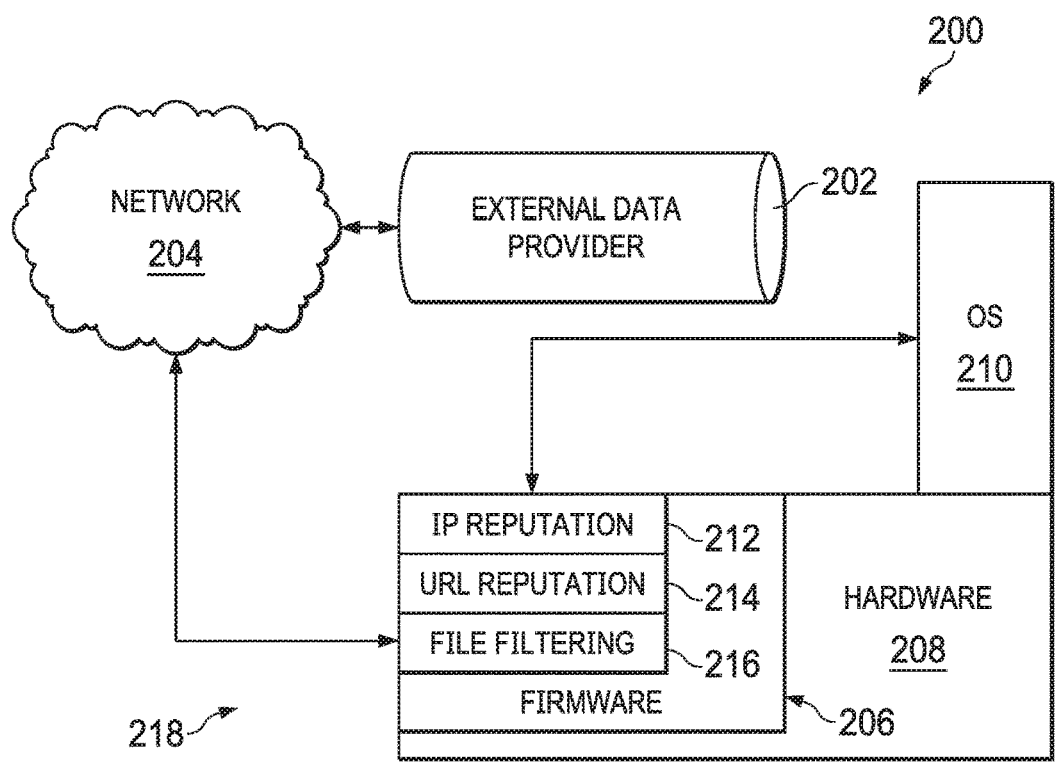
FIG. 2 illustrates a simplified structure of a distributed computer system 200 for partitioning an OS from IP reputation, URL reputation and file filtering utilizing a separation kernel.

Turning to FIG. 2, a simplified structure of a system 200 (e.g., a distributed computer network) for partitioning an OS from IP reputation, URL reputation, and file filtering utilizing a separation kernel is provided utilizing a separation kernel or firmware embedded in the hardware of a computing device in which several aspects of the invention may be implemented are provided.

As shown, a computing device 218 comprising an OS 210, hardware 208 and a separation firmware 206 is provided. The separation firmware 206 may contain software for implementing methods for performing IP reputation validation, as well as URL reputation and file filtering validation. It will be well understood by one of skill in the art that one or more of these features may be performed by the separation firmware 206 assuming the separation firmware contains the appropriate instructions for performing those features.

System 200 may comprise a distributed computer network whereby data traffic may flow between external data provider 202 (e.g., a server or server farm that handles requests for a website such as www.webroot.com or the like) and computing device 218 by way of network 204. Separation firmware 206 may be utilized to partition an OS 210 or hypervisor (not shown) from the process of IP reputation validation and management, as well as URL reputation validation and management, as well as file filtering.

According to an example, data may flow from external data provider 202 through network 204 to separation firmware 206, and IP reputation management, URL reputation management, and/or file filtering may be performed by separation firmware 206 such that the data from external data provider 202 is not passed along to the OS 210 until validation is performed at the separation firmware level. By initially keeping the IP reputation management process contained within separation firmware it is possible to prevent malware from directly interacting with the OS 210, and only upon determining that the IP reputation is safe will it then be passed on to the OS 210.

According to additional aspects, data may flow into a TCP/IP stack and IP reputation management may be performed within separation firmware 206, providing a separate protective environment, wherein malware such as botnets and other malicious content may be recognized and contained within separation firmware 206 until the malicious content is filtered or otherwise modified such that it is safe to pass along to OS 210. In contrast to the exemplary systems and methods disclosed herein, previous methods and systems for controlling pestware, malware, or other undesirable or unwanted applications and/or instructions such as botnets and other malicious data in the IP reputation environment were passed directly to the OS 210 for IP reputation management and filtering without the added benefit of partitioning the IP reputation screening from direct interaction with the OS 210, potentially compromising the OS 210 and other aspects of hardware 208 within computing device 208 that might otherwise be compromised.

Figure 3:
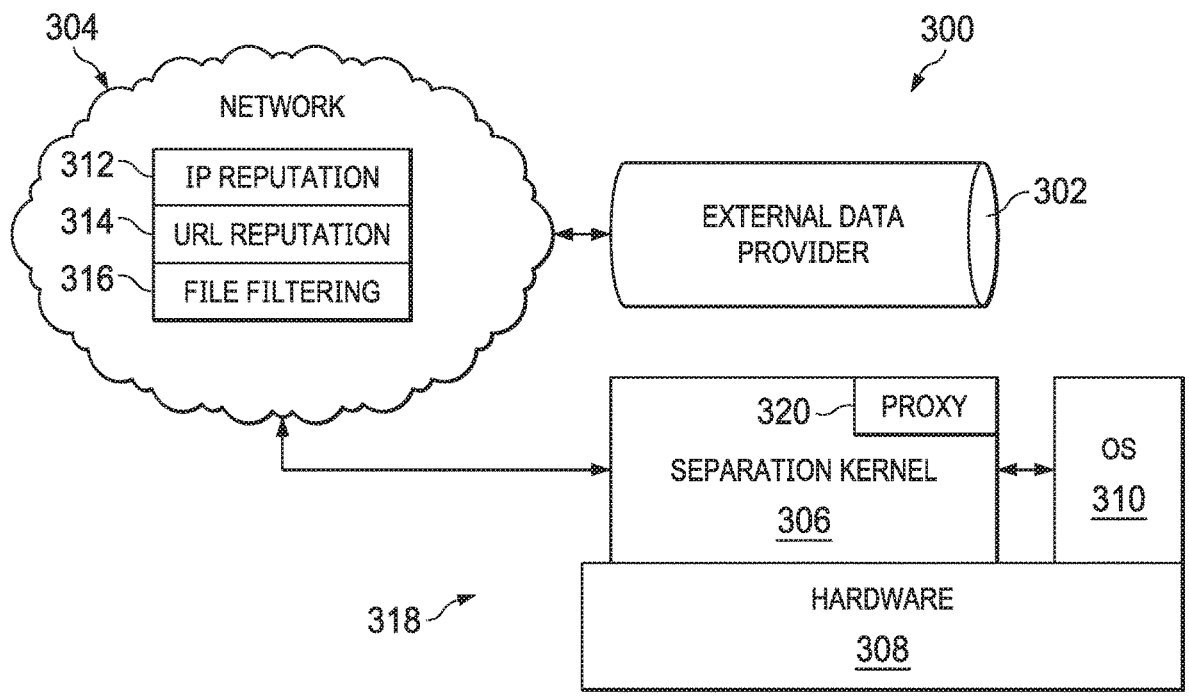
FIG. 3 illustrates a simplified structure of a distributed computer system 300 for partitioning an OS from IP reputation, URL reputation and file filtering utilizing a separation kernel and including an installed proxy for routing traffic through cloud-based proxy control software.

Turning to FIG. 3 a simplified structure of a system 300 for partitioning an OS from IP reputation, URL reputation, and file filtering utilizing a separation kernel and including an installed proxy within the separation kernel for routing traffic through cloud-based proxy controlled software is provided in which several aspects of the invention may be implemented are provided As shown, a computing device 318 comprising an OS 310, hardware 308 and a separation kernel 306 is provided. The separation kernel 306 may contain an installed proxy 320 for routing traffic through cloud-based proxy controlled software within a network 304 (e.g., servers maintained by a virus protection entity). According to aspects, data may be requested by computing device 318 from external data provider 302. For example, a user may request information from a travel website related to flight times, upon which time the request would be routed through the proxy 320 installed on separation kernel 306, and proxy 320 would further rout the request to network 304 containing one or more of IP reputation management software 312, URL reputation management software 314, and file filtering software 316 within servers maintained by a virus protection entity, with the various methods of performing these processes described supra.

As a further example, a user may request information from a travel website related to flight times by entering a command to the computing device 318 to direct a request to www.hipmunk.com. Upon entering that command, instead of the request being directly routed to external data provider 302 (in this case servers maintained by the travel website www.hipmunk.com), the request would be routed through network 304 (e.g., servers maintained by a virus protection entity that utilizes a URL reputation management network) at a specified IP address such as 67.38.10.1 (the virus protection entity's proxy), which may make a determination of whether the URL, in this case www.hipmunk.com, is safe to access utilizing URL reputation management software 314. If it is determined by the URL reputation management software 314 that the URL is safe, the request may then be passed to the website database external data provider 302.

According to additional aspects, upon routing the request through network 304, making the determination that the URL is safe, and passing the request to external data provider 302, the data requested by computing device 318 will flow back through network 304 (and through the virus protection entity's proxy) whereby additional screening may be performed on the received data, by for example IP reputation management software 312 and file filtering software 316 to prevent botnets or other malware from getting passed back through the separation kernel 306 and on to the OS 310. As will be well understood by those of skill in the art, the cloud-based proxy service as provided by aspects of the current invention and as illustrated in FIG. 3 may provide less delay in processing IP reputation, URL reputation, and file filtering than might be achieved if those processes were performed at the separation kernel level or firmware level on a device, assuming the servers employed in performing those processes have sufficient infrastructure to expeditiously process such requests. An additional advantage of performing IP reputation, URL reputation, and file filtering at the proxy cloud-based level is that in the ever expanding Internet of Things (IOT) universe, only a small bit of code controlling the proxy on the device is needed to route the traffic through to the proxy anti-virus servers.

In addition to the advantages described above with regard to utilizing separation kernels containing proxies that perform IP reputation, URL reputation, and file filtering, as well as the advantages of utilizing a proxy service installed on a separation kernel, with the number of devices in the IOT universe ever expanding, it is extremely common for individual manufactures of various devices to utilize any number of operating systems, which would necessitate writing different code for each of those operating systems to perform IP reputation management, URL reputation management, and file filtering. In contrast, utilizing a separation kernel to perform these functions a single bit of code may be written on the separation kernel for any device within the IOT (which would live outside the OS), and the malware protection can be performed by simply installing the separation kernel on each device, regardless of what OS they may happen to utilize.

Figure 4:
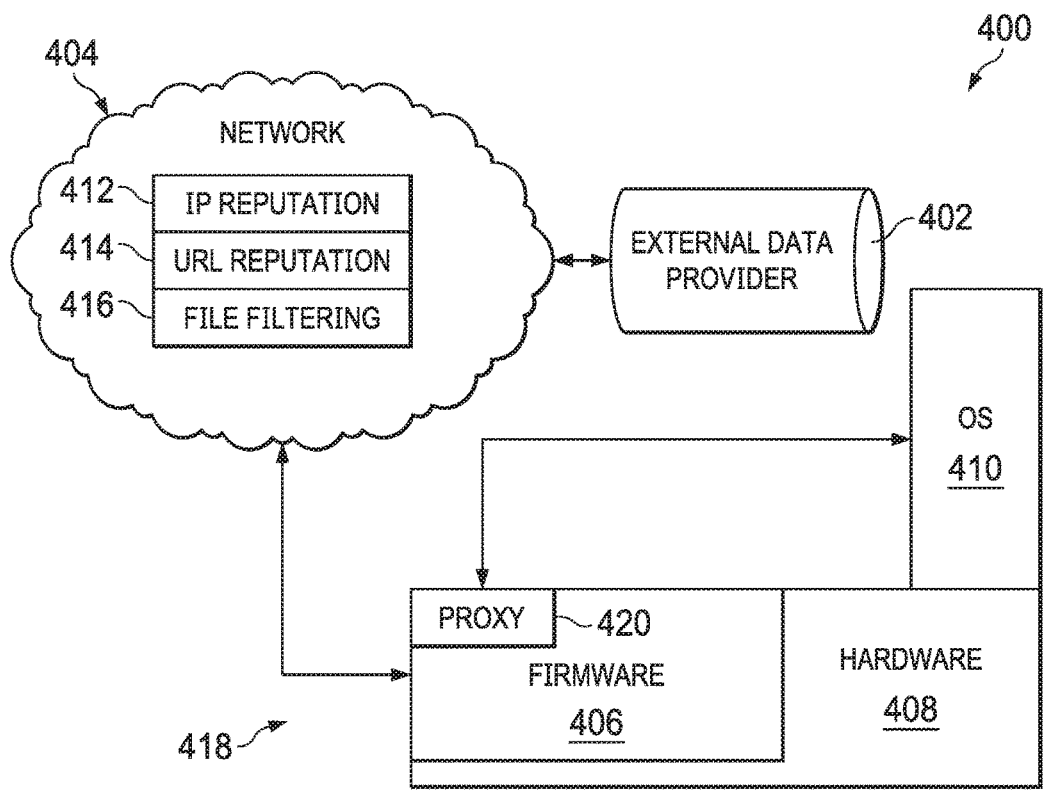
FIG. 4 illustrates a simplified structure of a distributed computer system 400 for partitioning an OS from IP reputation, URL reputation and file filtering utilizing firmware including an installed proxy for routing traffic through cloud-based proxy control software.

Turning to FIG. 4 a simplified structure of a system 400 for partitioning an OS from IP reputation, URL reputation, and file filtering utilizing separation firmware and including an installed proxy within the separation firmware for routing traffic through cloud-based proxy controlled software is provided in which several aspects of the invention may be implemented.

As shown, a computing device 418 comprising an OS 410, hardware 408 and separation firmware 406 is provided. The separation firmware 406 may contain an installed proxy 420 for routing traffic through cloud-based proxy controlled software within a network 404 (e.g., servers maintained by a virus protection entity). According to aspects, data may be requested by computing device 418 from external data provider 402. For example, a user may request information from a travel website related to flight times, upon which time the request would be routed through the proxy 420 installed on separation firmware 406, and proxy 420 would further rout the request to network 404 containing one or more of IP reputation management software 412, URL reputation management software 414, and file filtering software 416 within servers maintained by a virus protection entity, with the various methods of performing these processes described supra.

As a further example, a user may request information from a travel website related to flight times by entering a command to the computing device 418 to direct a request to www.hipmunk.com. Upon entering that command, instead of the request being directly routed to external data provider 402 (in this case servers maintained by the travel website www.hipmunk.com), the request would be routed through network 404 (e.g., servers maintained by a virus protection entity that utilizes a URL reputation management network) at a specified IP address such as 67.38.10.1 (the virus protection entity's proxy), which may make a determination of whether the URL, in this case www.hipmunk.com, is safe to access utilizing URL reputation management software 414. If it is determined by the URL reputation management software 414 that the URL is safe, the request may then be passed to the website database external data provider 402.

According to additional aspects, upon routing the request through network 404, making the determination that the URL is safe, and passing the request to external data provider 402, the data requested by computing device 418 will flow back through network 404 (and through the malware/virus protection entity's proxy) whereby additional screening may be performed on the received data, by for example IP reputation management software 412 and file filtering software 416 to prevent botnets or other malware from getting passed back through the separation firmware 406 and on to the OS 410. As will be well understood by those of skill in the art, the cloud-based proxy service as provided by aspects of the current invention and as illustrated in FIG. 4 may provide less delay in processing IP reputation, URL reputation, and file filtering than might be achieved if those processes were performed at the separation kernel level or firmware level on a device, assuming the servers employed in performing those processes have sufficient infrastructure to expeditiously process such requests. An additional advantage of performing IP reputation, URL reputation, and file filtering at the proxy cloud-based level is that in the ever expanding Internet of Things (IOT) universe, only a small bit of code controlling the proxy on the device is needed to route the traffic through to the proxy anti-virus servers.

In addition to the advantages described above with regard to utilizing separation firmware containing proxies that perform IP reputation, URL reputation, and file filtering, as well as the advantages of utilizing a proxy service installed on a separation kernel, with the number of devices in the IOT universe ever expanding, it is extremely common for individual manufactures of various devices to utilize any number of operating systems, which would necessitate writing different code for each of those operating systems to perform IP reputation management, URL reputation management, and file filtering. In contrast, utilizing separation firmware to perform these functions a single bit of code may be written on the separation firmware for any device within the IOT (which would live outside the OS), and the malware protection can be performed by simply installing the separation kernel on each device, regardless of what OS they may happen to utilize.

Figure 5:
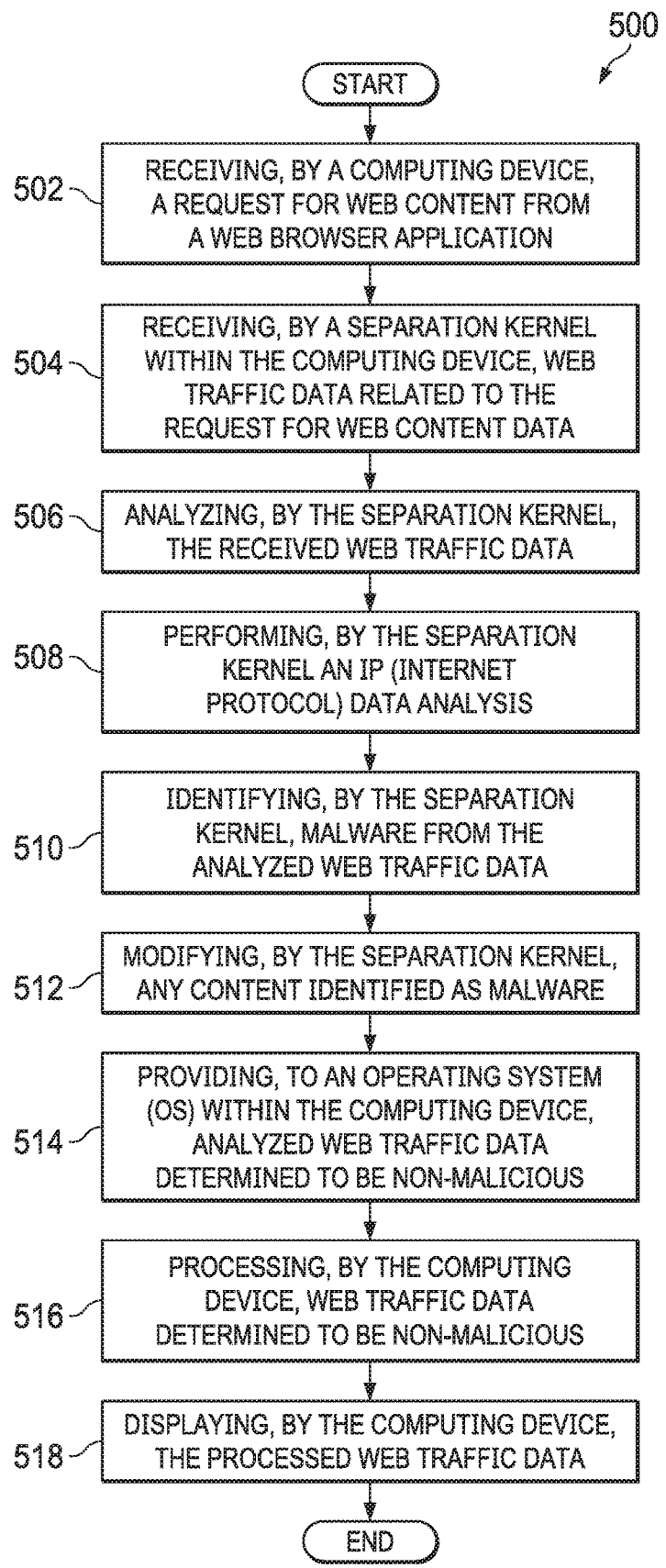
FIG. 5 is an exemplary method for detecting and preventing hostile network traffic flow appropriation and performing file filtering.

FIG. 5 illustrates an exemplary method 500 for detecting and preventing hostile network traffic flow appropriation and performing file filtering. In examples, flow 500 may be performed by various computing devices as broadly represented by the IOT. The method 500 may be implemented in hardware, software, or a combination of both.

Method 500 begins at operation 502, where a request for web content from a web browser application is received by, for example, by the computing device 118 of FIG. 1. In examples, the request may comprise a user request to access a website or download files from an external data provider 102. Flow continues to 504, where web traffic data related to the request for web content data is intercepted or received by a separation kernel 106 on computing device 118. At operation 506 the received web traffic data is analyzed by the separation kernel 106 and as flow continues to 508 an IP data analysis is performed by the separation kernel 106, as exemplified by IP reputation management software 112.

Flow continues to operation 510 where the separation kernel 106 identifies malware from the analyzed web traffic data. As flow continues to 512, the separation kernel 106 modifies any content that has been identified as malware.

Flow then continues to operation 514 where analyzed web traffic data determined by separation kernel 106 to be non-malicious is provided to the operating system 110 within the computing device 118.

At 516 web traffic data determined to be non-malicious is processed by the computing device 118 (e.g., using the operating system) and at operation 518 the computing device 118 displays the processed web traffic data.

Figure 6:
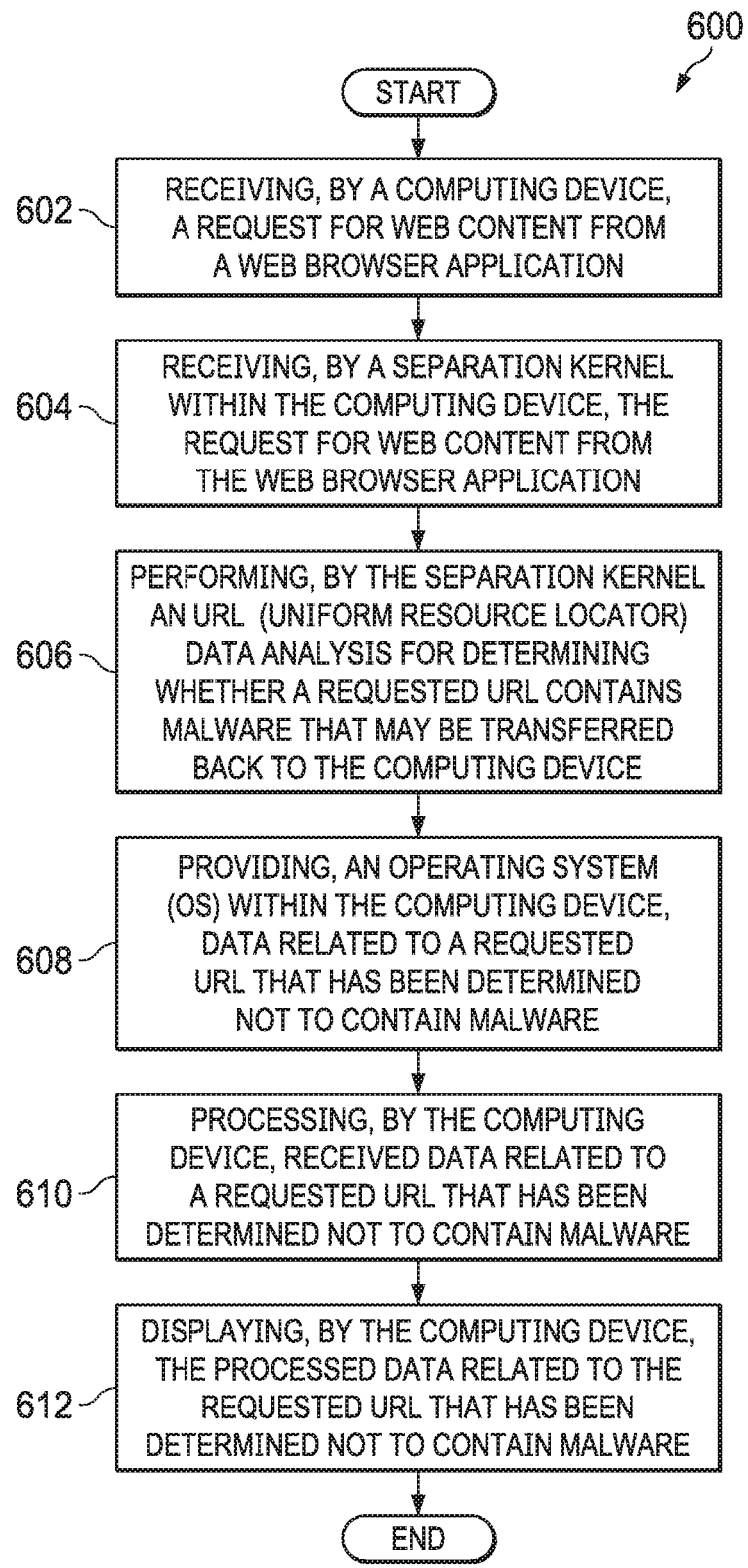
FIG. 6 is an additional exemplary method for detecting and preventing hostile network traffic flow appropriation and performing file filtering.

FIG. 6 illustrates another exemplary method for detecting and preventing hostile network traffic flow and performing file filtering. In examples, flow 600 may be performed by various computing devices as broadly represented by the IOT. The method 600 may be implemented in hardware, software, or a combination of both.

Method 600 begins at operation 602 where a request for web content from a web browser application is received by computing device 118 in FIG. 1, and at 604 the request for web content from the web browser application is intercepted or received by a separation kernel 106 within the computing device 118.

Flow continues to operation 606 where a URL data analysis for determining whether a requested URL contains malware that may be transferred back to the computing device 118 is performed by separation kernel 106, and more specifically URL reputation management software 114.

According to examples such a determination may be made by running the requested URL through a database which contains information relating to URLs that are trusted, not trusted, or that do not have a trust level associated with them.

Moving to operation 608 an operating system 110 within the computing device 118 is provided with data related to a requested URL that has been determined not to contain malware.

Flow continues to operation 610 where received data related to a requested URL that has been determined not to contain malware is processed by the computing device 118.

Moving to operation 612, the processed data related to the requested URL that has been determined not to contain malware is displayed by the computing device 118.

Figure 7:
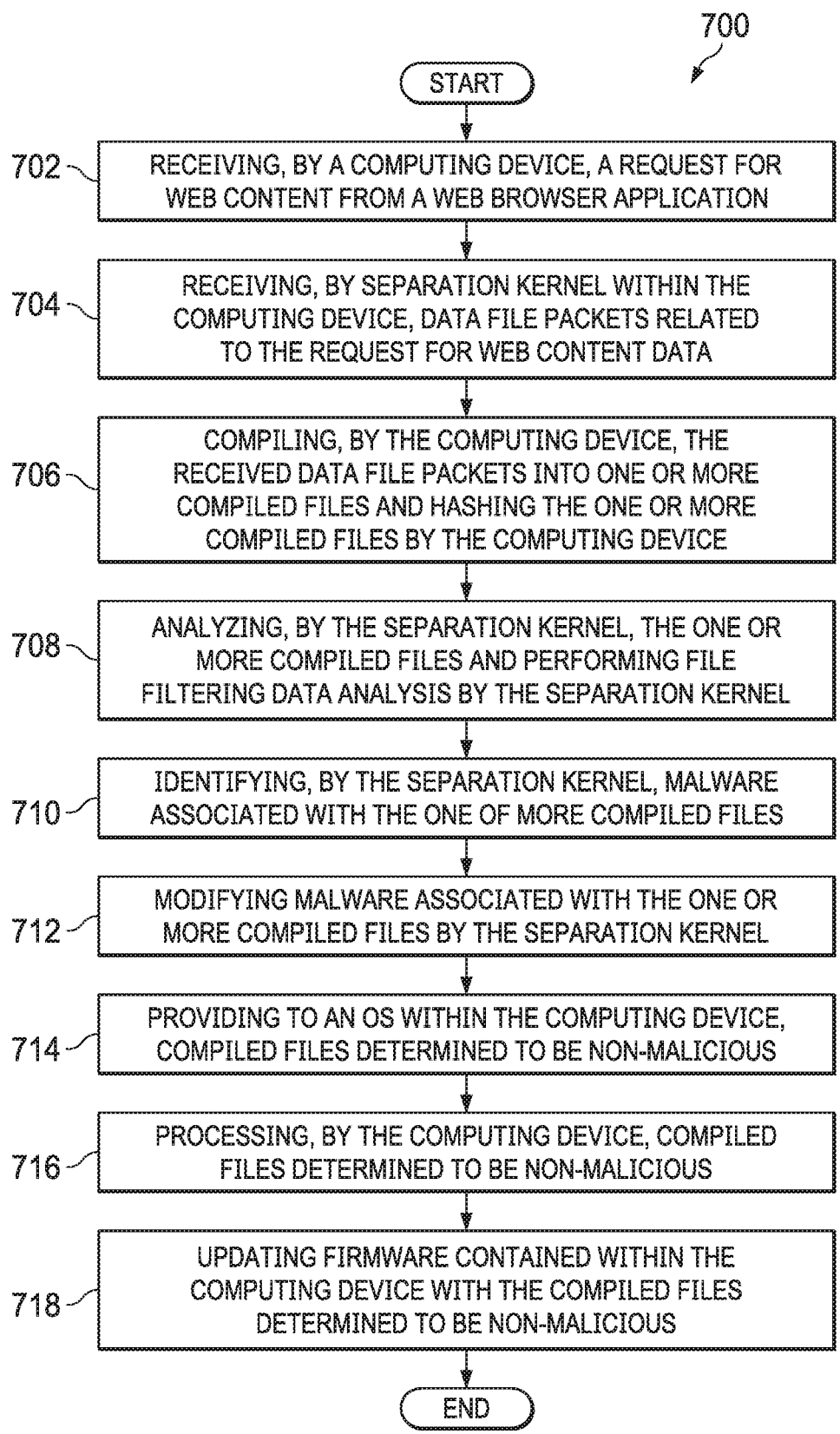
FIG. 7 is another exemplary method for detecting and preventing hostile network traffic flow appropriation and performing file filtering.

FIG. 7 illustrates another exemplary method for detecting and preventing hostile network traffic and performing file filtering. In examples, flow 700 may be performed by various computing devices as broadly represented by the IOT. The method 700 may be implemented in hardware, software, or a combination of both.

Method 700 begins at operation 702 where a request for web content from a web browser application is received by computing device 118 in FIG. 1. Moving to operation 704, data file packets related to the request for web content data are intercepted or received by the separation kernel 106 within computing device 118.

As flow continues to operation 706, the received data file packets are aggregated into one or more files and hashed by the computing device 118, by for example file filter management software 116. Flow then continues to operation 708.

At operation 708 one or more compiled files are analyzed and hashed by the separation kernel, and in an exemplary aspect by the file filter management software 116. Flow then continues to operation 710 where malware associated with one or more compiled files is identified by the file filter management software 116.

Flow then continues to operation 712 where malware associated with the one or more compiled files is modified by the separation kernel 106, and in exemplary aspects, the file filter management software 116. Flow then continues to operation 714.

At operation 714 compiled files determined to be non-malicious are provided to an operating system 110, and at operation 716 the compiled files that have been determined to be non-malicious are processed by the computing device 118.

Figure 8:
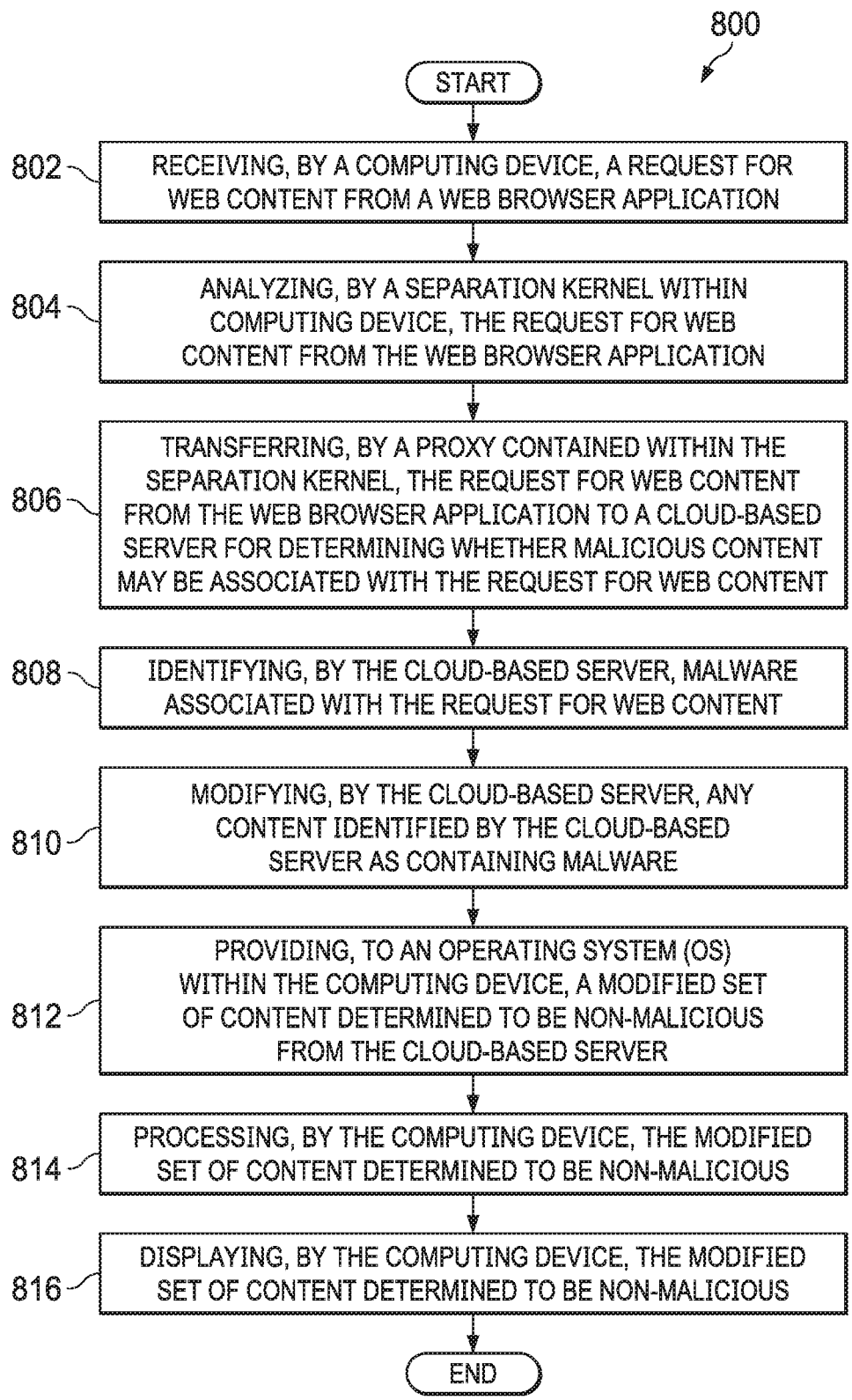
FIG. 8 is yet another exemplary method for detecting and preventing hostile network traffic flow appropriation and performing file filtering.

FIG. 8 illustrates yet another exemplary method for detecting and preventing hostile network traffic flow appropriation and performing file filtering. In examples, flow 800 may be performed by various computing devices as broadly represented by the IOT. The method 800 may be implemented in hardware, software, or a combination of both.

Method 800 begins at operation 802 where a request for web content from a web browser application is received by computing device 318 in FIG. 3, and at 804 the request for web content from the web browser application is intercepted or received by a separation kernel 306 within the computing device 318.

Flow continues to operation 806 where the request for web content from the web browser application is transferred by a proxy 320 contained within the separation kernel 306 to a cloud-based server 304 for determining whether malicious content may be associated with the request for web content.

Moving to operation 808, malware associated with the request for web content is identified by the cloud based server 304, and by way of an exemplary aspect, one of IP reputation management software 312, URL reputation management software 314, and/or file filter management software 316.

Continuing to operation 810, any content identified by the cloud-based server 304 as malware is modified by the cloud based server 304. Flow then continues to operation 812 where a modified set of content determined to be non-malicious from the cloud based server 304 is provided to an operating system 310 within the computing device 310.

Flow then continues to operation 814 where the modified set of content determined to be non-malicious is processed by the computing device 318, and at operation 816 the modified set of content determined to be non-malicious is displayed by the computing device 318.

FIG. 9 is a simplified diagram of a distributed computing system in which aspects of the present invention may be practiced. According to examples, any of computing devices 902A (a modem), 902B (a laptop computer), 902C (a tablet), 902D (a personal computer), 902E (a smart phone), and 902F (a server) may contain separation kernels 106 as exemplified in FIG. 1, including IP reputation management software 112, URL reputation management software 114, and file filtering management software 116. Any of computing devices 902A-F may also contain separation firmware 206 as exemplified in FIG. 2 containing one or more of IP reputation management software 212, URL reputation software 214, and file filtering software 216. Additionally, according to other aspects as discussed herein, any of computing devices 902A-F may contain a separation kernel 306 as exemplified in FIG. 3 installed with a proxy 320, and/or separation firmware 406 as exemplified in FIG. 4 installed with a proxy 420 for performing cloud-based proxy IP reputation management 912, URL reputation management 914, and file filtering management 916. Any and all of these functions may be performed, by way of example, at network servers 906 when computing devices 902A-F request or receive data from external data provider 918 by way of network 920.

Figure 10:
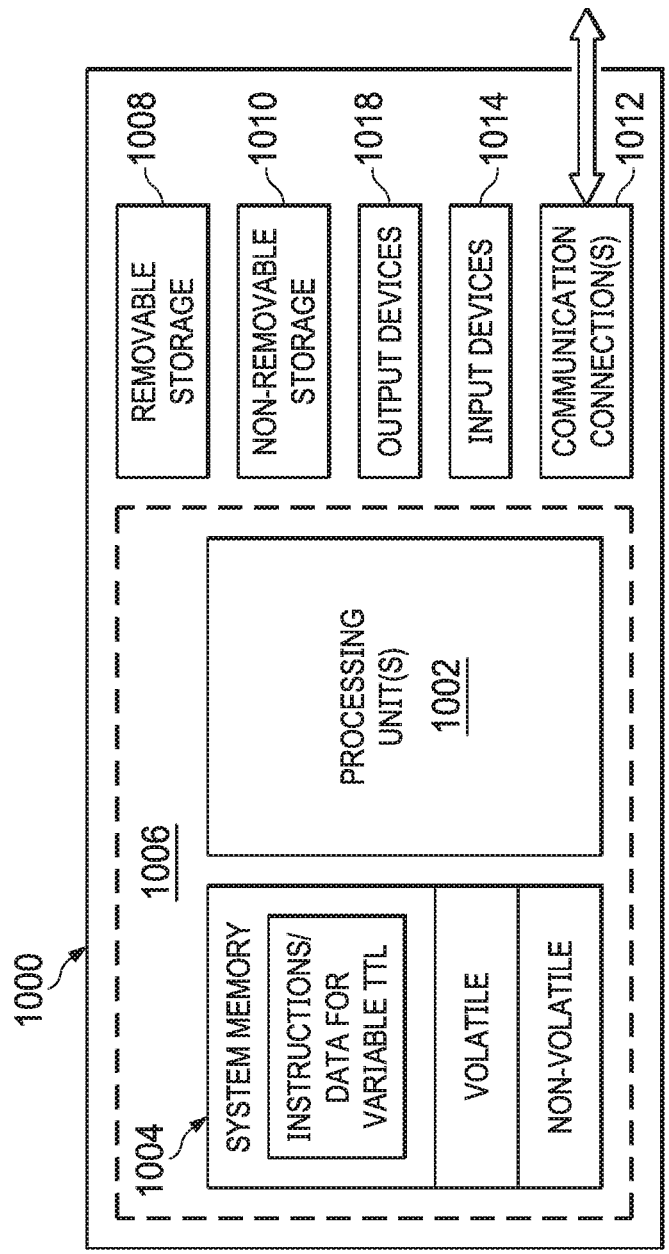
FIG. 10 illustrates one example of a suitable operating environment 1000 in which aspects of the present invention may be implemented.

FIG. 10 illustrates one example of a suitable operating environment 1000 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 1000 typically includes at least one processing unit 1002 and memory 1004. Depending on the exact configuration and type of computing device, memory 1004 (storing, among other things, reputation information, category information, cached entries, instructions to perform the methods disclosed herein, etc.) may be volatile (such as RAM), non-volatile (such as ROM, flash memory, etc.), or some combination of the two. This most basic configuration is illustrated in FIG. 10 by dashed line 1006. Further, environment 1000 may also include storage devices (removable, 1008, and/or non-removable, 1010) including, but not limited to, magnetic or optical disks or tape. Similarly, environment 1000 may also have input device(s) 1014 such as keyboard, mouse, pen, voice input, etc. and/or output device(s) 1016 such as a display, speakers, printer, etc. Also included in the environment may be one or more communication connections, 1012, such as LAN, WAN, point to point, etc.

Operating environment 1000 typically includes at least some form of computer readable media. Computer readable media can be any available media that can be accessed by processing unit 1002 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 1000 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Associating a TTL modifier with reputation and category information related to a cached entry from a particular data source or having a particular type allows for the calculation of a variable TTL that is optimized (e.g., results in better utilization of the cache) for the particular cached entry. However, as previously discussed, a significant amount of analysis may be required to accurately assign a reputation or category to a data source. Furthermore, significant analysis may also be required to correctly associate a TTL modifier with a particular reputation score and/or category. Generally, client computing devices do not have the computational resources to perform such analysis. Returning now to FIG. 9, the smart caching system may also include a distributed, or cloud, network 914. In aspects, the cloud network 914 has the resources required to classify a data source by reputation and category and to determine TTL modifiers based upon the classification. In embodiments, the cloud network 914 includes a reputation module 912 and 914. The reputation module may be used to determine and store reputation classifications for different data sources, such as network server(s). Reputation module 912 and 914 may also store reputation information. In embodiments, reputation module 912 and 914 may provide reputation information for a data source in response to receiving a request for reputation information from a client device (such as one of client devices 902A-F) or, in other embodiments, may periodically provide reputation information for a plurality of resources to each client device 902A-F. In such embodiments, the client devices may calculate a variable TTL for each cached entry without requesting assistance, or reputation information, from the cloud network 914 every time data is added to the local cache.

Embodiments disclosed herein may be employed with any type of application and/or device capable of caching data. In one embodiment, the smart cache embodiments disclosed herein may cache URLs as part of a web filtering system. In another embodiment, the smart cache embodiments disclosed herein may be used to cache IP information for an IP threat detection system. The smart cache embodiments may also be employed by mobile applications that regularly change due to updates and new releases. While specific uses of the embodiments of the present disclosure have been provided herein, one of skill in the art will appreciate that the embodiments may be employed to by other types of systems or to accomplish other tasks without departing from the scope of the present disclosure.

Aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure described some aspects of the present technology with reference to the accompanying drawings, in which only some of the possible aspects were shown. Other aspects may, however, be embodied in many different forms and should not be construed as limited to the embodiments set forth herein. Rather, these examples were provided so that this disclosure was thorough and complete and fully conveyed the scope of the possible aspects to those skilled in the art.

Although specific examples were described herein, the scope of the technology is not limited to those specific examples. One skilled in the art will recognize other aspects, examples or improvements that are within the scope and spirit of the present technology. Therefore, the specific structure, acts, or media are disclosed only as illustrative examples according to the disclosure.

What is claimed is:
1. A method comprising:
receiving, by a computing device, a request for web content from a web browser application;
receiving, by a separation kernel within the computing device, web traffic data related to the request for web content data, wherein the separation kernel is in a memory space not shared by an operating system of the computing device and partitions the operating system from Internet Protocol (IP) data analysis;
analyzing, by the separation kernel without use of the operating system, the received web traffic data;
performing, by the separation kernel without use of the operating system, Internet Protocol (IP) data analysis;

identifying, by the separation kernel without use of the operating system, malware from the analyzed web traffic data;

modifying, by the separation kernel without use of the operating system, the web traffic data to remove content identified as malware from the web traffic data;

providing, from the separation kernel to the operating system within the computing device, the modified web traffic data;

processing, by the computing device, web traffic data determined to be non-malicious; and displaying, by the computing device, the processed web traffic data.

2. The method of claim 1, wherein the separation kernel prevents the operating system from receiving hostile network traffic flow by intercepting the received web content data.

3. The method of claim 1, wherein the separation kernel comprises software for implementing at least one of IP reputation validation, Uniform Resource Locator (URL) reputation validation, and file filtering.

4. The method of claim 1, wherein analyzing the received web traffic data comprises determining one or more classifications for the received web traffic data.

5. The method of claim 1, wherein the IP data analysis is used to determine the trustworthiness of one or more data sources.

6. The method of claim 5, wherein the trustworthiness of the one or more data sources is represented by a reputation score corresponding to a probability the web traffic data comprises malicious content.

7. The method of claim 6, wherein the reputation score is obtained by analyzing at least one of characteristics, performance, and behavior of the one or more data sources over a time period.

8. A method comprising:
receiving, by a computing device, a request for web content from a web browser application;

receiving, by a separation kernel within the computing device, the request for web content from the web browser application, wherein the separation kernel is in a memory space not shared by an operating system of the computing device and partitions the operating system from URL data analysis;

performing, by the separation kernel without use of the operating system, a URL data analysis for determining whether a requested URL contains malware that is transferrable to the computing device;

receiving, by the separation kernel, web content associated with the request;

processing, by the separation kernel without use of the operating system, the web content to remove malware;

providing, to the operating system within the computing device from the separation kernel within the computing device, the processed web content;

processing, by the computing device, received data related to the requested URL; and displaying, by the computing device, the processed data related to the requested URL.

9. The method of claim 8, wherein the URL data analysis is performed using a URL reputation management component accessible to the separation kernel.

10. The method of claim 8, wherein determining whether a requested URL contains malware comprises evaluating the requested URL against a database containing information related to the trustworthiness of one or more URLs.

11. The method of claim 8, wherein the separation kernel prevents the operating system from receiving hostile network traffic flow from one or more data providers.

12. A method comprising:
receiving, by a computing device, a request for web content from a web browser application;

receiving, by separation kernel within the computing device, data file packets related to the request for web content data, wherein the separation kernel is in a memory space not shared by an operating system of the computing device and partitions the operating system from file filtering data analysis;

aggregating, by the computing device, the received data file packets into one or more files;

hashing, by the computing device, the one or more files;

analyzing, by the separation kernel without use of the operating system, the one or more files;

performing, by the separation kernel without use of the operating system, a file filtering data analysis on the one or more files to identify malware associated with the one or more files;

in response to identifying malware, modifying, by the separation kernel without use of the operating system, the one or more files to remove content associated with the identified malware;

providing, from the separation kernel within the computing device to the operating system within the computing device, a set of files determined to be non-malicious, wherein the set of files comprises at least one file from which content associated with the identified malware was removed;

processing, by the computing device, the set of files determined to be non-malicious; and updating firmware contained within the computing device with the set of files determined to be non-malicious.

13. The method of claim 12, wherein the separation kernel prevents the operating system from receiving hostile network traffic flow by intercepting the received data file packets.

14. The method of claim 12, wherein the aggregation of the data file packets and the hashing of the one or more files is performed using a file filter management component accessible to the separation kernel.

15. The method of claim 12, wherein modifying the content associated with the malware includes removing one or more portions of the one or more files.

16. The method of claim 12, wherein the set of files determined to be non-malicious includes at least one file comprising content modified by the separation kernel.

17. A method comprising:
receiving, by a computing device, a request for web content from a web browser application;

analyzing, by a separation kernel the request for web content, wherein the separation kernel is in a memory space not shared by an operating system of the computing device and partitions the operating system from a proxy in the separation kernel;

transferring, using the proxy contained within the separation kernel without use of the operating system, the request for web content to a cloud-based server for determining whether malicious content is associated with the request for web content;

in response to determining malicious content is associated with the request for web content, modifying, by the cloud-based server, the web content to remove the malicious content;

providing, by the cloud-based server, the modified web content to the operating system of the computing device and separate from the separation kernel, wherein the modified web content comprises web content from which malicious content was removed;

processing, by the computing device, the modified web content; and displaying, by the computing device, the modified web content.

18. The method of claim 17, wherein identifying malware associated with the request for web content comprises using at least one of: an IP analysis, a URL analysis, and a file filter process.

\* \* \* \* \*